United States Patent
Mickle et al.

(10) Patent No.: US 7,823,183 B2
(45) Date of Patent: Oct. 26, 2010

(54) METHODS, SYSTEMS AND COMPUTER PROGRAM PRODUCTS FOR PROVIDING INTERNET PROTOCOL TELEVISION COMMUNICATION SERVICES

(75) Inventors: Jacklyn A. Mickle, Decatur, GA (US); Michael W. Smith, Dacula, GA (US); James Chilton, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 700 days.

(21) Appl. No.: 11/321,013

(22) Filed: Dec. 28, 2005

(65) Prior Publication Data

US 2007/0162930 A1    Jul. 12, 2007

(51) Int. Cl.
*H04N 7/173* (2006.01)
(52) U.S. Cl. .......... 725/132; 725/119; 725/86; 725/87; 725/91; 725/100; 725/103
(58) Field of Classification Search .......... 725/105, 725/109, 110, 111, 113, 114, 115, 116, 117, 725/118, 119
See application file for complete search history.

(56) References Cited

U.S. PATENT DOCUMENTS

| | | | |
|---|---|---|---|
| 5,963,249 A | 10/1999 | Kim | |
| 6,775,670 B2 | 8/2004 | Bessette | |
| 7,522,904 B1 | 4/2009 | Zhu | |
| 2002/0012347 A1 | 1/2002 | Fitzpatrick | |
| 2003/0204562 A1 | 10/2003 | Hwang | |
| 2004/0031058 A1 | 2/2004 | Reisman | |
| 2004/0093370 A1 | 5/2004 | Blair et al. | |
| 2004/0153712 A1 | 8/2004 | Owhadi et al. | |
| 2005/0021766 A1* | 1/2005 | McKeowen et al. | 709/228 |
| 2005/0183130 A1* | 8/2005 | Sadja et al. | 725/107 |
| 2005/0262540 A1 | 11/2005 | Swix et al. | |
| 2006/0227714 A1 | 10/2006 | Griffin et al. | |
| 2007/0041554 A1 | 2/2007 | Newman et al. | |
| 2007/0058043 A1 | 3/2007 | Thukral | |
| 2007/0074258 A1 | 3/2007 | Wood et al. | |
| 2007/0088827 A1 | 4/2007 | Starbuck et al. | |
| 2007/0112939 A1 | 5/2007 | Wilson et al. | |
| 2007/0115860 A1 | 5/2007 | Samele et al. | |
| 2007/0116184 A1 | 5/2007 | Gonsalves et al. | |
| 2007/0283405 A1 | 12/2007 | Cha | |

* cited by examiner

*Primary Examiner*—Brian Ensey
*Assistant Examiner*—Sunita Joshi
(74) *Attorney, Agent, or Firm*—Cantor Colburn LLP

(57) ABSTRACT

A method of providing communications services to customer premise equipment (CPE) coupled to a television. The method includes operating a network element as a communications terminal server, the network element being part of a communications network. The network element receives from the CPE a request to initiate communications with a diagnostic system coupled to the communications network. The network element accesses a communications application executing on a communications server coupled to the communications network and pushes a communications interface to the CPE. The network element receives message information from the CPE and routes the message information to the communications server to initiate delivery of a message to the diagnostic system.

17 Claims, 6 Drawing Sheets

| STB ID | OS VERSION | GUID | PHONE NUMBER | HARD DRIVE | MEMORY REMAIN | USER NAME | |
|---|---|---|---|---|---|---|---|
| xx8902746 | 4.1 | 123.4.5.89 | 123-456-7890 | 100G | 80G | Mr. Smith | |
| | | | | | | | |
| | | | | | | | |

FIGURE 3

| Customer Name | | Phone number | |
|---|---|---|---|
| STB ID | | | |
| STB GUID | | | |
| OS VERSION | | | |
| Phone number | | | |

METHODS, SYSTEMS AND COMPUTER PROGRAM PRODUCTS FOR PROVIDING INTERNET PROTOCOL TELEVISION COMMUNICATION SERVICES

BACKGROUND

The present disclosure relates generally to internet protocol television (IPTV), and more particularly, to methods, systems, and computer program products for providing IPTV support.

Currently, IPTV services are provided to users through IPTV networks and in-home devices, such as set top boxes (STBs). When a user experiences difficulty in receiving the IPTV services, the existing process is for the user to call a customer service representative to seek assistance. The customer service representative can often respond to routine issues, but may have difficulty responding to more complex issues. This often results in the IPTV service provider sending a technician to the user's location to diagnose and resolve the issue. Unfortunately, the task of sending technicians to a user's location is costly and time consuming for both the service provider and the user.

There is a need in the art for methods and systems to facilitate diagnosis and resolution of IPTV service issues without requiring sending a technician to visit the user.

SUMMARY

Embodiments include a method of providing communications services to customer premise equipment (CPE) coupled to a television. The method includes operating a network element as a communications terminal server, the network element being part of a communications network. The network element receives from the CPE a request to initiate communications with a diagnostic system coupled to the communications network. The network element accesses a communications application executing on a communications server coupled to the communications network and pushes a communications interface to the CPE. The network element receives message information from the CPE and routes the message information to the communications server to initiate delivery of a message to the diagnostic system. Embodiments further include a computer program product for implementing the method.

Additional embodiments include a customer premise equipment (CPE), the CPE coupled to an internet protocol television (IPTV) network. The CPE includes a network interface establishing communications between the CPE and the IPTV network. A processor executes an IPTV client for receiving IPTV services. The processor executes a diagnostic API for transmitting CPE status information indicating the status of the CPE to a network element in the IPTV network. The processor generates a request to initiate communications with a diagnostic system. The processor generates a communications interface for the user and routes message information to the network element to initiate delivery of a message to the diagnostic system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES:

FIG. 3 depicts contents of a database in exemplary embodiments;

FIG. 4 depicts a template in exemplary embodiments;

The detailed description explains the preferred embodiments of the invention, together with advantages and features, by way of example with reference to the drawings.

DETAILED DESCRIPTION OF EXEMPLARY EMBODIMENTS

Figure 1:
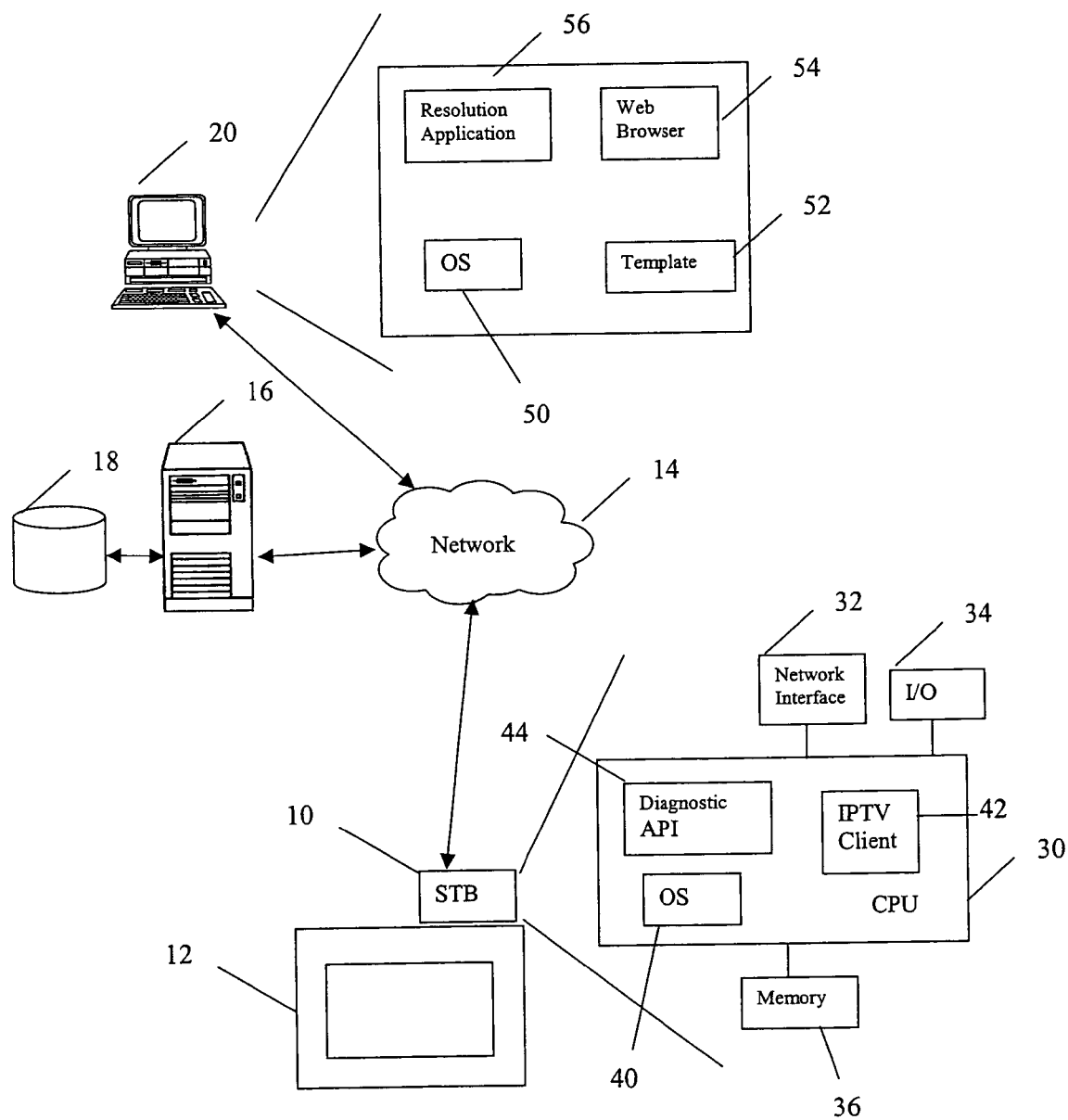
FIG. 1 depicts a system for providing IPTV diagnostics in exemplary embodiments.

FIG. 1 depicts a system for providing IPTV diagnostic services in exemplary embodiments. The system includes one or more set top boxes (STB) 10 coupled to one or more displays 12, e.g., a television. Alternatively, an STB 10 may be integrated with the display 12 in the same device. The STB is one example of customer premise equipment (CPE) that may interface with an IPTV network. Exemplary CPE includes STBs, mobile devices, voice over internet protocol (VoIP) devices, televisions with integrated equipment, etc.

The STB 10 receives IPTV services such as broadcast video, broadcast audio, video on demand, etc. from various sources (not shown). The STB 10 communicates with an IPTV network 14. The network 14 may be implemented using a variety of networks and network components including, but not limited to, digital subscriber line (DSL), public switched telephone network (PSTN), cable networks, Internet, cellular, WiFi (IEEE 802.11), WiMax (IEEE 802.16), satellite, etc. According to one embodiment, IPTV services may be provided using a software platform, such as the Microsoft TV IPTV Edition running on network elements in network 14. In exemplary embodiments, network 14 is a telecommunications network providing broadband services over a DSL connection to the STB. As embodiments are directed at IPTV diagnostics, details of the IPTV services are not described herein.

The STB 10 communicates with a database server 16 over network 14. The database server 16 may be implemented using known servers to execute computer programs to perform the processes described herein. The database server 16 collects STB information from the STB 10. A database 18 stores the STB information from the STB 10 as described in further detail herein. The database 18 may be a separate device from database server 16 or memory within database server 16.

A diagnostic system 20 is also in communication with the network 14. The diagnostic system 20 may be implemented using a general-purpose computer executing a computer program to carry out the processes described herein. The diagnostic system 20 may be operated by personnel of an entity providing the IPTV services to STB 10. In exemplary embodiments, the user of STB 10 contacts customer service personnel operating diagnostic system 20 to obtain diagnostic assistance.

According to an exemplary embodiment, the STB 10 includes a processor 30, a network interface 32, an input/ output device 34 and memory 36. The input output device 34 provides a mechanism for a user to interact with the STB 10. For example, the input/output device 34 may receive commands from a user's remote control. Alternatively, the input/output device 34 may be implemented using technologies including, but not limited to, touch screens, voice recognition, wired/wireless peripherals (keyboard, mouse, joystick, trackball), personal digital assistants (PDAs), wireless phones, etc. Further, the input/output device 34 may communicate directly with other, non-human devices such as servers and/or computers for configuring the STB. The network interface 32 provides the communication interface with network 14. The network interface 32 may be implemented using existing communication devices such as a DSL modem, cable modem, etc. Processor 30 may be a general-purpose microprocessor executing a computer program for executing the processes described herein. The processor 30 may access memory (e.g., RAM) containing a computer program for execution.

Memory 36 is used for storing a variety of information. Memory 36 may store STB information such as serial number of the STB 10, ID of the STB (e.g., an addressable ID, such as a globally unique identifier or GUID), configuration information such as software information and hardware information. Additional features of the STB information are provided herein. The memory 36 also stores content, such as recorded broadcast television and may include memory that serves as a digital video recorder (DVR). The DVR memory may be implemented using a variety of non-volatile memory devices including, but not limited to, hard drives, flash memory, optical storage devices, solid state memory, etc., used alone or in combination.

The processor 30 executes software applications including an operating system 40 (e.g. Microsoft CE), an IPTV client 42 and a diagnostic application program interface (API) 44. The operating system 40 provides the software environment for execution of the other programs. The IPTV client is responsible for reception of IPTV services such as broadcast television, video-on-demand (VOD), news, radio broadcasts, etc. Existing IPTV clients may be used in the STB 10.

The diagnostic API 44 collects STB information in real time and sends the diagnostic information to the database server regularly. The diagnostic API 44 may send diagnostic information at predetermined intervals (e.g., every N minutes) or may send diagnostic information upon the detection of a change (e.g., upon upgrading operating system or detecting new hardware). As described in further detail herein, the database server 16 receives the diagnostic information and stores it in database 18 for use by diagnostic system 20.

The diagnostic system 20 may be operated by personnel (e.g., customer service representative) of an entity providing the IPTV services to STB 10. The diagnostic system 20 executes software applications 50, 52, 54 and 56 as described herein. The diagnostic system 20 executes an operating system 50 (e.g., Microsoft Windows) that provides the software environment for executing other applications. A web browser 54 is used to access database server 16. Database server 16 executes a web server application that permits access to database 18 via a web interface.

A data template 52 on the diagnostic system 20 provides data search and retrieval functions. The template 52 serves as a tool for retrieving data from the database 18 in an orderly format, easily presented to the customer service representative operating diagnostic system 20.

The resolution application 56 operates to facilitate diagnosis of issues experienced by the STB and the user of the STB. The resolution application 56 processes data from the database 18 to determine how to resolve issues at the STB. The resolution may include operations performed by the STB and/or by the user of the STB as described in further detail herein.

Figure 2:
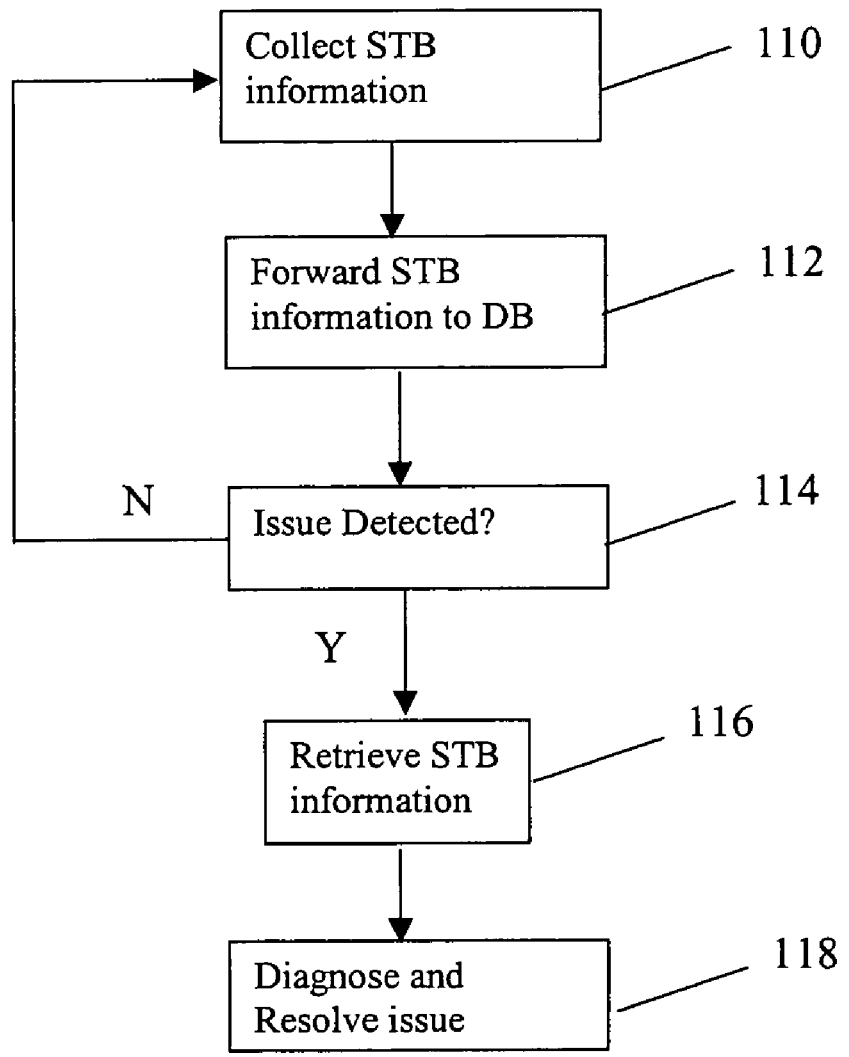
FIG. 2 depicts a method of providing IPTV diagnostics in exemplary embodiments.

FIG. 2 is a flow chart of processing implemented in exemplary embodiments. In operation, the diagnostic system 20 executes a resolution application 56 to address issues occurring at the STB 10. The resolution application 56 accesses data in database 18 to diagnose these issues. The process begins at step 110 where the diagnostic API 44 collects STB information. The STB information may include a variety of data related to the STB 10. The STB information may include STB identification data such as STB serial number, STB GUID, phone number associated with the STB user, address of the location of the STB, user name, etc. The STB information also includes STB operational data such as the current channel the STB is tuned to, current menu the STB is accessing, whether content is currently being stored to memory 36, etc. The STB information may include STB software data such as boot read only memory (ROM) version, operating system (OS) version, and IPTV client version. STB information may also include communication parameters such as basic DSL related diagnostic information, sync rate, port statistics, assigned IP address to the DSL modem router or static IP address, etc. Other STB information includes resource data such as available physical memory, available virtual memory, allocated physical memory, allocated managed memory, whether a hard drive is present (e.g., DVR), total hard disk space, dynamic host configuration protocol (DHCP) lease time remaining, default gateway, media access control (MAC) address, video type, etc.

The diagnostic API 44 collects the STB information and sends the STB information to database 18 as shown at step 112. Information may be collected by the API 44 in real time or at regular intervals. FIG. 3 illustrates exemplary content of the database 18. As shown, the database 18 includes records having numerous fields for each STB, including data forwarded by the diagnostic API 44. It is understood that numerous fields are not depicted in FIG. 3 and the fields shown are exemplary. The STB information collected by the API 44 may be stored and periodically sent to database 18 at regular intervals. Alternatively, the STB information may be sent in real time. For example, the diagnostics API 44 may routinely (every N minutes) monitor information on the STB and send the STB information to the database 18. Alternatively, certain data may be sent once and then updated when a change is detected in the STB. For example, the OS 40 of the STB 10 is not expected to change frequently. Thus, the diagnostic API 44 can forward information regarding the OS 40 initially and then not send additional OS information until an update in the OS is detected. This reduces the amount of information sent to the database 18. Other STB information, such as the channel currently being viewed or the menu function being accessed by the user, may be sent to the database 18 in real time or in regular intervals. Thus, the database 18 includes a combination of historic information and more current, e.g., real time, information to diagnose STB issues.

According to an exemplary embodiment, the transmission of STB information to the database 18 continues until an issue is detected as shown at step 114. An issue may be detected in a number of ways. For example, a user of the STB 10 may report the issue by phone, e-mail or live chat to the operator of the diagnostic system 20. For example, the user may call a customer care number to report an issue with viewing and recording of a program (e.g., tiling). Alternatively, the resolution application 56 may run an analysis routine on data in database 18 to detect trends that indicate an issue is present or likely. For example, the resolution application 56 may examine data in the database 18 to detect STBs having hard drives that are almost completely full. Such a condition can negatively effect operation of the STB. Thus, these STBs would be flagged as having an issue by the resolution application 56.

If an issue is raised, flow proceeds to step 116 where the data corresponding to the STB experiencing the issue is retrieved. This step may be performed by diagnostic personnel using the template 52 as shown in FIG. 4. The template 52 includes a number of entries corresponding to fields in the database 18. If a user calls the service center, for example, caller identification is used to retrieve the user's phone number using existing caller identification mechanisms. The phone number is then used to retrieve the STB information for that user by accessing database 18 using the phone number to index a record associated with the caller. If the issue is automatically detected by the resolution application 56, the data corresponding to the STB is retrieved and may be presented in the template 52 to customer service personnel at diagnostic system 20.

At step 118, the issue experienced at the STB 10 is diagnosed and resolved. This diagnosis may be automatically derived by the resolution application 56. For example, the resolution application 56 may automatically detect that the memory 36 on the STB 10 is almost completely full, thereby flagging an issue. The resolution application 56 may then resolve the issue by sending a message to the STB, which may be presented to the user's display, that content needs to be deleted from memory 36 to improve operation.

Alternatively, the user and the customer service representative may discuss the issue (phone, live chat, etc.) and determine a resolution. For example, the customer service representative may evaluate the STB information and suggest certain actions be taken by the user (e.g., alter system set-up) or may initiate corrective measures (e.g., initiate an update of STB software). The resolution application 56 includes diagnostic tools to identify issues that may not be readily apparent to the customer service personnel. For example, the resolution application 56 may recognize outdated software versions on the STB, incorrect communication settings on the STB, etc. There are many other conditions the application can test/detect such as provisioning of the STB based on bill plan (e.g., customer is paying for VOD, but doesn't have access to a VOD server). Other conditions include detecting if throughput rates for video packets upstream and downstream are within threshold limits. Further, line noise and jitter may be detected. Thus, the customer service representative using the diagnostic system 20 may accomplish more effective issue resolution.

Figure 5:
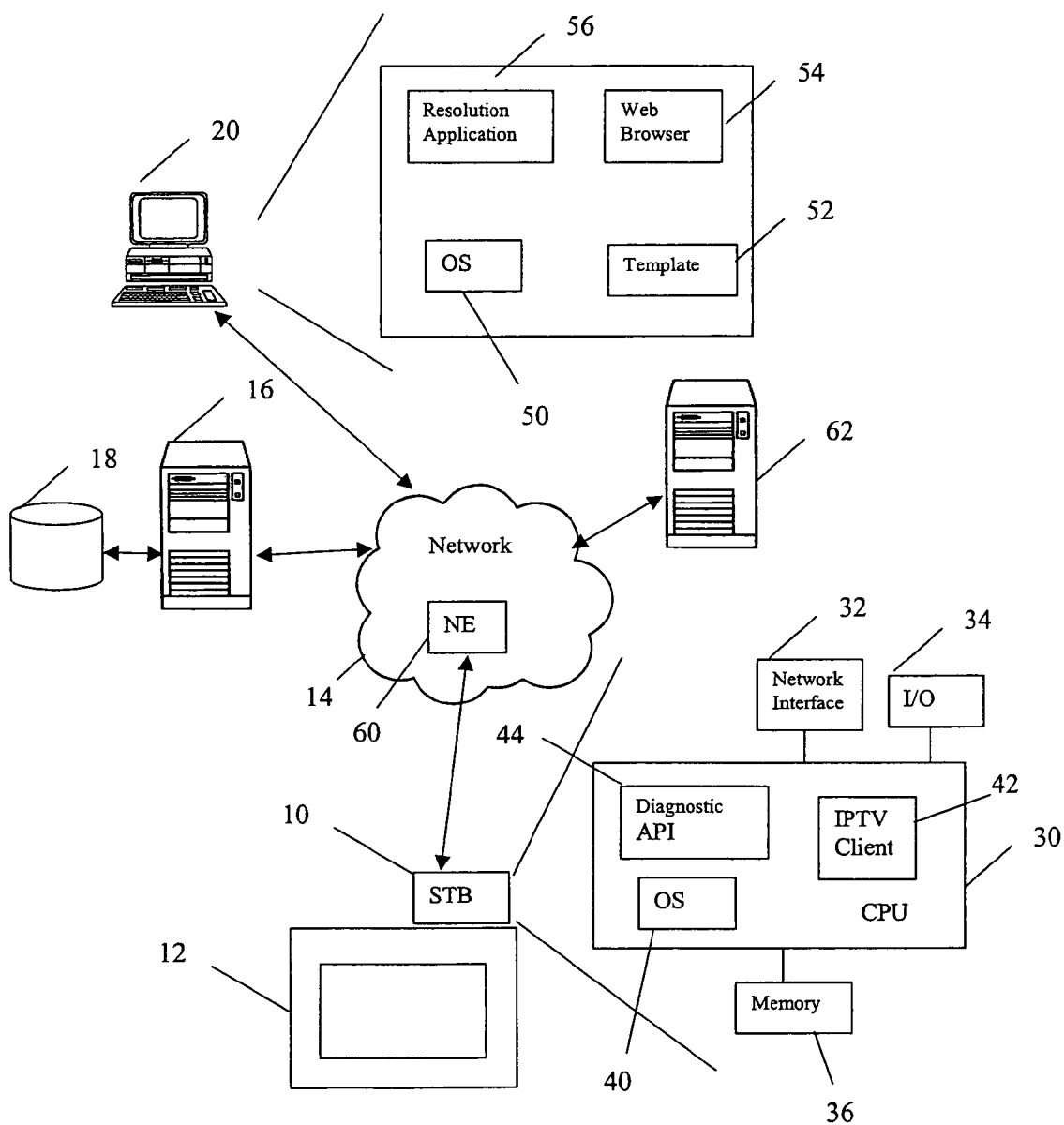
FIG. 5 depicts a system for providing IPTV communications services in exemplary embodiments.

FIG. 5 depicts exemplary system architecture in embodiments that facilitate communication between the user of the STB 10 and the customer service representative at the diagnostic system 20. The network 14 includes a network element 60 that operates as a terminal server for a client communication application in the STB 10. The network element 60 includes a processor (e.g., one or more microprocessors) and executes a computer program to perform the functions described herein. The network element 60 may be a device located at a customer's central office (CO) or in other components of the communications network 14.

In exemplary embodiments, the STB 10 executes a thin client, such that the network element 60 performs substantially all the processing needed for the STB 10 to establish communications. Exemplary thin client applications include remote desktop protocol (RDP) clients from Microsoft, ICA clients from Citrix, Java clients, etc.

In exemplary embodiments, the network element 60 operates as an e-mail and/or chat terminal server to provide e-mail and chat functionality to the STB 10. The network element 60 operates in conjunction with a communications server 62 coupled to network 14. Communications server 62 handles routing of messages (e-mail or chat) using known protocols (POP, SMTP, etc.) and runs the necessary e-mail and/or chat server applications to route communications between the diagnostic system 20 and the STB 10. It should be noted that the e-mail and e-chat functions may be implemented on separate sets of server clusters, rather than a single server as shown in FIG. 5.

Figure 6:
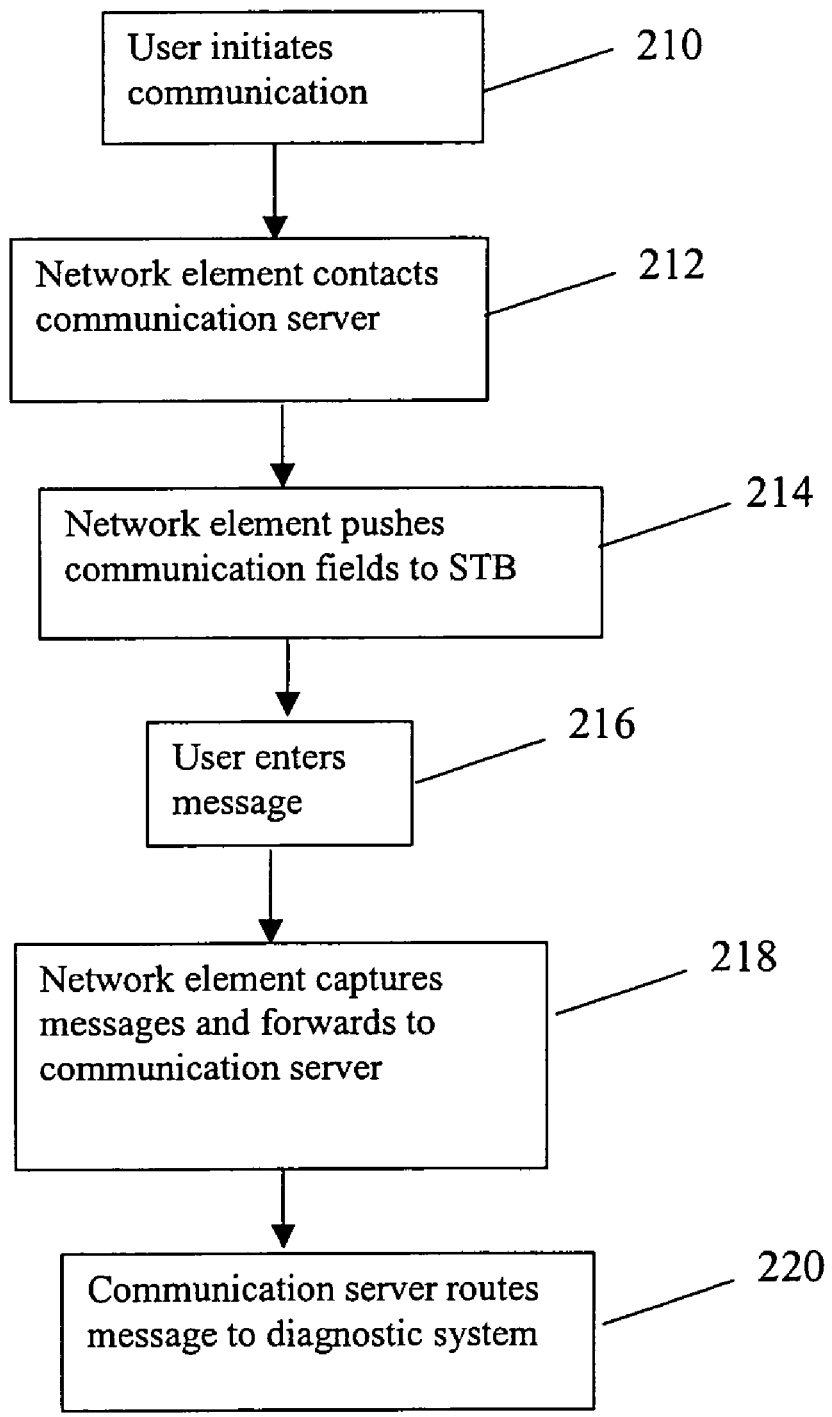
FIG. 6 depicts a method of providing communications in exemplary embodiments.

In operation, the user of STB 10 can establish communications with the diagnostic system 20 through I/O device 34. The I/O device 34 may be a remote control, a keypad on the STB, a wired/wireless keyboard coupled to the STB, a voice recognition system, etc. Any device for capturing text from the user may be used as the I/O device 34. FIG. 6 is a flowchart of a process for initiating communications from the STB 10 to the diagnostic system 20.

At step 210, the user initiates communications by selecting e-mail or text-based chat through appropriate menus on television 12. Once a type of communication has been selected, the network element 60 contacts the communications server 62 to access the appropriate software application at 212. For example, if e-mail communication is requested, the network element 60 accesses an e-mail application on communication server 62 (e.g., Microsoft Outlook®).

At step 214, the network element 60 operates as a terminal server for the STB 10 and pushes the e-mail communications interface to the STB 10. The STB 10 is not running the email software, but an e-mail message template appears on the television. The user enters the necessary items (e.g., addressee, subject) and the text of the message and sends the message and step 216. At step 218, the network element 60 captures the message information and routes the message information (e.g., addressee, subject, message text) to the communications server 62. The communications server 62 routes the message to the diagnostic system 20 using known communication protocols.

Although FIG. 6 is directed to e-mail communications from the STB 10 to the diagnostic system 20, it is understood that similar operations are performed for communications from the diagnostic system to the STB. Regardless of direction of communication, or the type (e-mail or chat), the network element 60 operates as a terminal server to a thin client executing on a STB associated with a television 12. The text-based chat application executes similarly with the network element pushing and pulling messages to and from the STB 10. This allows the user to establish communications with customer support personnel to resolve issues. If immediate resolution is not available, then the user can submit a trouble ticket through e-mail or e-chat. The trouble ticket serves as a request for a service call from a technician.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of providing communications services to customer premise equipment (CPE) coupled to a television, the method comprising:
    operating a network element as a communications terminal server, the network element being part of a communications network;
    receiving at the network element a request from the CPE to initiate communications with a diagnostic system coupled to the communications network;
    the network element accessing a communications application executing on a communications server coupled to the communications network, the communications server providing communications with the diagnostic system;
    the network element pushing a communications interface to the CPE;
    the network element receiving message information from the CPE; and,
    the network element routing the message information to the communications server to initiate delivery of a message to the diagnostic system from the communications server;
    wherein the CPE operates a thin client application for interfacing with the network element, the network element executing processing for the CPE to establish communications with the diagnostic system.

2. The method of claim 1 wherein:
    the request to initiate communications is a request to send an e-mail.

3. The method of claim 2 wherein:
    the communications server executes an e-mail application, the network element pushing the e-mail interface to the CPE for display on the television.

4. The method of claim 1 wherein:
    the request to initiate communications is a request to initiate chat.

5. The method of claim 4 wherein:
    the communications server executes a chat, the network element pushing the chat interface to the CPE for display on the television.

6. The method of claim 1 wherein:
    the thin client application is remote desktop protocol.

7. A computer program product providing communications services to customer premise equipment (CPE) coupled to a television, the computer program product comprising:
    a storage medium readable by a processing circuit and storing instructions for execution by the processing circuit for facilitating a method comprising:
    operating a network element as a communications terminal server, the network element being part of a communications network;
    receiving at the network element a request a request from the CPE to initiate communications with a diagnostic system coupled to the communications network;
    the network element accessing a communications application executing on a communications server coupled to the communications network, the communications server providing communications with the diagnostic system;
    the network element pushing a communications interface to the CPE;
    the network element receiving message information from the CPE;
    the network element routing the message information to the communications server to initiate delivery of a message to the diagnostic system from the communications server;
    wherein the CPE operates a thin client application for interfacing with the network element, the network element executing processing for the CPE to establish communications with the diagnostic system.

8. The computer program product of claim 7 wherein:
the request to initiate communications is a request to send an e-mail.

9. The computer program product of claim 8 wherein:
the communications server executes an e-mail application, the network element pushing the e-mail interface to the CPE for display on the television.

10. The computer program product of claim 7 wherein:
the request to initiate communications is a request to initiate chat.

11. The computer program product of claim 10 wherein:
the communications server executes a chat, the network element pushing the chat interface to the CPE for display on the television.

12. The computer program product of claim 7 wherein:
the thin client application is remote desktop protocol.

13. A customer premise equipment (CPE), the CPE coupled to an internet protocol television (IPTV) network, the CPE comprising:
    a network interface establishing communications between the CPE and the IPTV network; and
    a processor executing an IPTV client for receiving IPTV services;
    the processor executing a diagnostic API for transmitting CPE status information indicating the status of the CPE to a network element in the IPTV network;
    the processor generating a request to initiate communications with a diagnostic system via a communications server providing communications with the diagnostic system, the request transmitted to the network element in communication with a communications server;
    the processor generating a communications interface for the user, the communications interface pushed to the CPE by the network element;
    the processor routing message information to the network element to initiate delivery of a message to the diagnostic system via the communications server;

wherein the CPE operates a thin client application for interfacing with the network element.

14. The CPE of claim 13 wherein:
the request to initiate communications is a request to send an e-mail.

15. The CPE of claim 13 wherein:
the request to initiate communications is a request to initiate chat.

16. The CPE of claim 13 wherein:
the thin client application is remote desktop protocol.

17. The CPE of claim 13 wherein:
the CPE is a set top box (STB) coupled to a television.

* * * * *